US011455457B2

(12) United States Patent
Rose et al.

(10) Patent No.: US 11,455,457 B2
(45) Date of Patent: *Sep. 27, 2022

(54) DISPLAYING A DEFINED PREVIEW OF A RESOURCE IN A GROUP-BASED COMMUNICATION INTERFACE

(71) Applicant: SLACK TECHNOLOGIES, INC., San Francisco, CA (US)

(72) Inventors: Sean Rose, San Francisco, CA (US); Christopher Sullivan, San Francisco, CA (US); Allen James Ferrick, San Francisco, CA (US); Timothy Lefler, Vancouver (CA); Salman Suhail, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/810,940

(22) Filed: Mar. 6, 2020

(65) Prior Publication Data

US 2020/0279070 A1 Sep. 3, 2020

Related U.S. Application Data

(63) Continuation of application No. 15/655,981, filed on Jul. 21, 2017, now Pat. No. 10,621,272.

(51) Int. Cl.
*G06F 40/106* (2020.01)
*H04L 9/40* (2022.01)
(Continued)

(52) U.S. Cl.
CPC .......... *G06F 40/106* (2020.01); *G06F 3/0482* (2013.01); *G06F 40/226* (2020.01);
(Continued)

(58) Field of Classification Search
CPC ... G06F 17/212; G06F 17/2725; H04L 51/04; H04L 63/083; H04L 63/065; H04L 63/0807; H04L 63/102; H04L 63/104
See application file for complete search history.

(56) References Cited

U.S. PATENT DOCUMENTS 6,212,548 B1 * 4/2001 DeSimone .......... H04L 12/1813
709/204
6,353,928 B1 * 3/2002 Altberg ..................... G06F 8/61
717/175

(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Robert B Leung
(74) *Attorney, Agent, or Firm* — Lee & Hayes, P.C.

(57) ABSTRACT

Provided is a group-based communication interface, on a computing device, configured to display a defined preview of a resource. The computing device receives a group-based message including a resource request that identifies a requested resource and a resource address. The computing device compares the resource address with a list of subscribed resource addresses and determines from the comparison of the resource address and the subscribed resource addresses that the resource address is associated with a resource provider and is thus a subscribed resource address. In response to determining that the resource address is the subscribed resource address, the computing device provides a defined preview request comprising authentication information to the resource provider, receives defined preview data from the resource provider, and renders the defined preview of the resource based on the defined preview data to (Continued)

the group-based communication interface associated with the group-based message.

20 Claims, 10 Drawing Sheets

(51) Int. Cl.
    *G06F 3/0482*     (2013.01)
    *H04L 51/04*     (2022.01)
    *G06F 40/226*     (2020.01)
    *H04L 67/01*     (2022.01)

(52) U.S. Cl.
    CPC ............ *H04L 51/04* (2013.01); *H04L 63/083* (2013.01); *H04L 63/0807* (2013.01); *H04L 63/102* (2013.01); *H04L 63/104* (2013.01); *H04L 67/01* (2022.05)

(56) References Cited

U.S. PATENT DOCUMENTS

| | | | |
|---|---|---|---|
| 7,516,488 B1* | 4/2009 | Kienzle | H04L 51/12 726/22 |
| 8,015,450 B1* | 9/2011 | Cooley | G06F 8/61 714/38.1 |
| 2007/0005652 A1* | 1/2007 | Choi | G06F 16/955 |
| 2015/0154156 A1* | 6/2015 | Meyers, Jr | G06F 40/134 715/205 |
| 2015/0220499 A1* | 8/2015 | Katic | G06F 40/106 715/207 |
| 2016/0283085 A1* | 9/2016 | Beausoleil | H04L 67/1097 |
| 2016/0285882 A1* | 9/2016 | Brunn | H04L 63/0823 |
| 2017/0039168 A1* | 2/2017 | Hassan | G06F 40/123 |
| 2017/0163635 A1* | 6/2017 | Hirata | H04L 63/0807 |
| 2017/0230320 A1* | 8/2017 | Knight | H04L 51/04 |
| 2018/0287982 A1 | 10/2018 | Draeger et al. | |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, LEXISNEXIS, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", TEDIUM, [online][retrieved May 9, 2019], Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.
Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", FUJITSU Sci. Tech. J., 36, 2, (Dec. 2000) 154-161.
Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, is Valued at $1.1 Billion", The New York Times Blogs (BITS), LEXISNEXIS, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Carlson, Mark. "Enabling Rich Previews of Shared Links," AvenueCode.com, published on Feb. 15, 2017, retrieved at https://blog.avenuecode.com/rich-previews-of-shared-links on Dec. 2, 2019, 13 pages.
Haughey, Matt, "Everything you ever wanted to know about unfurling but were afraid to ask /or/ How to make your site previews look amazing in Slack," Medium.com, Nov. 24, 2015, retrieved at https://medium.com/slack-developer-blog/everything-you-ever-wanted-to-know-about-unfurling-but-were-afraid-to-ask-or-how-to-make-your-e64b4bb9254 on Dec. 2, 2019, 15 pages.
Oosterhof, Richard, "How to Optimize your Site for Rich Previews," Medium.com, Dec. 15, 2015, retrieved at https://medium.com/@richardoosterhof/how-to-optimize-your-site-for-rich-previews-527ed13a6d69 on Dec. 2, 2019, 3 pages.
Slack, "Team Communication for the 21st Century," (watch the tour video), Mar. 2016, retrieved from https://web.archive.org/web/20160326191803/https://slack.com/is on Aug. 1, 2019, 3 pages.

* cited by examiner

Group-Based Communication Interface 300

Group-Based Communication Channel 301

- Channel A
- Channel B
- Channel C
- Channel D
- Channel E
- Channel F 302
303

304A — Mari: 11:34 AM — 330A
Can someone send the document?

304B — Anna: 11:35 AM — 330B
This is a copy of the document:
307 — [Technical Document]

Matt: 11:37 AM — 330C
Here's the link to the shared document: https://doc.ACME.com/12345

304E —  Technical Document   Development Team
            314              316                  318
Overview
312 — Users may post a link to third-party service whose contents are hidden behind authentication. Occasionally, these service providers will build an APP to detect these links and post useful contextual information in the channel. ...... Show More
                                                                320
                                                                322

305 — Send a reply

FIG. 3C

DISPLAYING A DEFINED PREVIEW OF A RESOURCE IN A GROUP-BASED COMMUNICATION INTERFACE

This Application is a continuation of and claims priority to U.S. patent application Ser. No. 15/655,981, filed Jul. 21, 2017, which is incorporated herein by reference.

BACKGROUND

Various messaging systems are available that allow users to communicate using mobile phones, computers, and similar devices. Applicant has identified a number of deficiencies and technical problems associated with messaging systems configured for such devices. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure provided herein include methods, apparatus, and computer program products for displaying a defined preview of a resource in a group-based communication interface.

In one example embodiment, a method for displaying a defined preview of a resource in a group-based communication interface that is selected from a plurality of group-based communication interfaces, wherein the group-based communication interface comprises a plurality of group-based communication channels is provided. The method includes receiving, from a client device hosting the group-based communication interface, a group-based message transmission including a group-based message associated with a selected group-based communication channel of the plurality of group-based communication channels, wherein the group-based message comprises a resource request that identifies a requested resource and a resource address. The method also includes comparing the resource address with a list of subscribed resource addresses, determining from the comparison of the resource address and the subscribed resource addresses that the resource address is associated with a resource provider and is thus a subscribed resource address, and in response to determining that the resource address is the subscribed resource address, providing a defined preview request comprising authentication information to the resource provider. The method also further includes receiving defined preview data from the resource provider and rendering the defined preview of the resource based on the defined preview data to the group-based communication interface associated with the group-based message.

In some examples, the resource request is a uniform resource locator (URL).

In some examples, the method further includes parsing the URL into one or more components, verifying the URL by determining the one or components of the URL: comprise a top-level-domain (TLD), comprise one or more domains and subdomains, are not an internet protocol (IP) address, and comprise an application protocol.

In further examples embodiments of the method, prior to providing the defined preview request to the resource provider the method includes determining the subscribed resource addresses are associated with a defined preview application (APP), determining that the APP is not installed in a group-based communication interface instance, installing the APP in the interface instance, wherein an installation of the APP updates the group-based communication interface instance, receiving user authentication information from a user, and providing a user authentication token comprising the user authentication information to the resource provider.

In some examples, the APP updates the group-based communication interface instance to provide the defined preview request and receive the defined preview data to the group-based communication interface.

In some examples, the resource request is a first resource request that identifies the requested resource and the resource address received in the interface instance.

In some example embodiments, the resource request is received from a user in the selected group-based communication channel, wherein the authentication information comprises an event token identifying the user, and wherein the resource provider compares the event token with a previously received user authentication token and authenticates the defined preview request only when the event token and the user authentication token match.

In some examples, the defined preview data comprises user authenticated defined preview data, wherein the user authenticated defined preview data is provided from the resource provider only in response to authenticated defined preview requests.

In some examples, the defined preview request further comprises one or more of an identification of the selected group-based communication channel, a timestamp representing a time the resource request was received, and an identification of a resource address, wherein the identification includes a uniform resource locator.

In some embodiments, multiple resource providers are subscribed to receive the resource request for the resource address, the method also further includes, providing a defined preview request to each of the multiple resource providers, receiving defined preview data from each of the multiple resource providers, and rendering multiple defined previews based on each defined preview data to the group-based communication interface associated with the group-based message.

In some examples, the defined preview comprises interactive graphical elements, wherein each interactive graphical element comprises a user selectable item.

In some example embodiments, the method further includes determining from the comparison of the resource request and the subscribed resource addresses that the resource request is not associated with a resource provider and is thus is not a subscribed resource address, gathering metadata from the resource address, and displaying a metadata preview of the requested resource based on the gathered metadata.

In another example embodiment an apparatus is provided. The apparatus, comprising at least a processor, and a memory associated with the processor having computer coded instructions therein, with the computer instructions configured to, when executed by the processor, display a defined preview of a resource in a group-based communication interface selected from a plurality of group-based communication interfaces, wherein the group-based communication interface comprises a plurality of group-based communication channels, by causing the apparatus to receive, from a client device hosting the group-based communication interface, a group-based message transmission including a group-based message associated with a selected group-based communication channel of the plurality of group-based communication channels, wherein the group-based message includes with a resource request that identifies a requested resource and a resource address, compare the resource address with a list of subscribed resource addresses, and determine from the comparison of the resource address and the subscribed resource addresses that the resource address is associated with a resource provider and is thus a subscribed resource address. Then computer instructions are also configured, when executed by the processor, to cause the apparatus to, in response to determining that the resource address is the subscribed resource address, provide a defined preview request comprising authentication information to the resource provider, receive defined preview data from the resource provider, and render the defined preview of the resource based on the defined preview data to the group-based communication interface associated with the group-based message.

In some examples of the apparatus, the resource request is a uniform resource locator (URL).

In some embodiments of the apparatus, the computer instructions may be configured to, when executed by the processor, cause the apparatus to parse the URL into one or more components, verify the URL by determining the one or components of the URL: comprise a top-level-domain (TLD), comprise one or more domains and subdomains, are not an internet protocol (IP) address, and comprise an application protocol.

In some examples, the computer instructions are configured to, when executed by the processor, cause the apparatus to, prior to providing the defined preview request to the resource provider determine the subscribed resource addresses are associated with a defined preview application (APP), determine that the APP is not installed in a group-based communication interface instance, install the APP in the interface instance, wherein an installation of the APP updates the group-based communication interface instance, receive user authentication information from a user, and provide a user authentication token comprising the user authentication information to the resource provider.

In some embodiments, the APP updates the group-based communication interface instance to provide the defined preview request and receive the defined preview data to the group-based communication interface.

In some example embodiments, the resource request is a first resource request that identifies the requested resource and the resource address received in the interface instance.

In some examples, the resource request is received from a user in the selected group-based communication channel, wherein the authentication information comprises an event token identifying the user, and wherein the resource provider compares the event token with a previously received user authentication token and authenticates the defined preview request only when the event token and the user authentication token match.

In some examples, the defined preview data comprises user authenticated defined preview data, wherein the user authenticated defined preview data is provided from the resource provider only in response to authenticated defined preview requests.

In some examples, the defined preview request further comprises one or more of an identification of the selected group-based communication channel, a timestamp representing a time the resource request was received, and an identification of a resource address, wherein the identification includes a uniform resource locator.

In some examples, multiple resource providers are subscribed to receive the resource request for the resource address, and the computer instructions are configured to, when executed by the processor, cause the apparatus to provide a defined preview request to each of the multiple resource providers, receive defined preview data from each of the multiple resource providers, and render multiple defined previews based on each defined preview data to the group-based communication interface associated with the group-based message.

In some examples, the defined preview comprises interactive graphical elements, wherein each interactive graphical element comprises a user selectable item.

In some examples, the computer instructions are further configured to, when executed by the processor, cause the apparatus to determine from the comparison of the resource request and the subscribed resource addresses that the resource request is not associated with a resource provider and is thus is not a subscribed resource address, gather metadata from the resource address, and display a metadata preview of the requested resource based on the gathered metadata.

In another example embodiment, a computer program product is provided. The computer program product comprising a non-transitory computer readable medium having computer program instructions stored therein, said instructions when executed by a processor display a defined preview of a resource in a group-based communication interface selected from a plurality of group-based communication interfaces, wherein the group-based communication interface comprises a plurality of group-based communication channels, by causing the computer program product to receive, from a client device hosting the group-based communication interface, a group-based message transmission including a group-based message associated with a selected group-based communication channel of the plurality of group-based communication channels, wherein the group-based message comprises a resource request that identifies a requested resource and a resource address, compare the resource address with a list of subscribed resource addresses, and determine from the comparison of the resource address and the subscribed resource addresses that the resource address is associated with a resource provider and is thus a subscribed resource address. The computer instructions are configured to, when executed by the processor, also cause the computer program product to, in response to determining that the resource address is the subscribed resource address, provide a defined preview request comprising authentication information to the resource provider, receive defined preview data from the resource provider, and render the defined preview of the resource based on the defined preview data to the group-based communication interface associated with the group-based message.

In some example embodiments, the resource request is a uniform resource locator (URL).

In some examples, the computer instructions are configured to, when executed by the processor, further cause the computer program product to parse the URL into one or more components, verify the URL by determining the one or components of the URL: comprise a top-level-domain (TLD), comprise one or more domains and subdomains; are not an internet protocol (IP) address, and comprise an application protocol.

In some example embodiments, the computer instructions are configured to, when executed by the processor, prior to providing the defined preview request to the resource provider, further cause the computer program product to determine the subscribed resource addresses are associated with a defined preview application (APP), determine that the APP is not installed in a group-based communication interface instance, install the APP in the interface instance, wherein an installation of the APP updates the group-based communication interface instance, receive user authentication information from a user, and provide a user authentication token comprising the user authentication information to the resource provider.

In some examples, the APP updates the group-based communication interface instance to provide the defined preview request and receive the defined preview data to the group-based communication interface.

In some examples, the resource request is a first resource request that identifies the requested resource and the resource address received in the interface instance.

In some example embodiments, the resource request is received from a user in the selected group-based communication channel, wherein the authentication information comprises an event token identifying the user, and wherein the resource provider compares the event token with a previously received user authentication token and authenticates the defined preview request only when the event token and the user authentication token match.

In some examples, defined preview data comprises user authenticated defined preview data, wherein the user authenticated defined preview data is provided from the resource provider only in response to authenticated defined preview requests.

In some example embodiments, the defined preview request further comprises one or more of: an identification of the selected group-based communication channel, a timestamp representing a time the resource request was received, and an identification of a resource address, wherein the identification includes a uniform resource locator.

In some examples, multiple resource providers are subscribed to receive the resource request for the resource address, and wherein the computer instructions are configured to, when executed by the processor, further cause the computer program product to provide a defined preview request to each of the multiple resource providers, receive defined preview data from each of the multiple resource providers, and render multiple defined previews based on each defined preview data to the group-based communication interface associated with the group-based message.

In some examples, the defined preview comprises interactive graphical elements, wherein each interactive graphical element comprises a user selectable item.

In some embodiments, the computer instructions are configured to, when executed by the processor, further cause the computer program product to determine from the comparison of the resource request and the subscribed resource addresses that the resource request is not associated with a resource provider and is thus is not a subscribed resource address, gather metadata from the resource address, and display a metadata preview of the requested resource based on the gathered metadata.

BRIEF DESCRIPTION OF THE FIGURES

Reference will now be made to the accompanying drawings, which are not necessarily drawn to scale, and wherein:

FIGS. 3A-3C illustrate example defined previews of a resource displayed in a group-based communication interface in accordance with some embodiments discussed herein;

DETAILED DESCRIPTION

Figure 1:
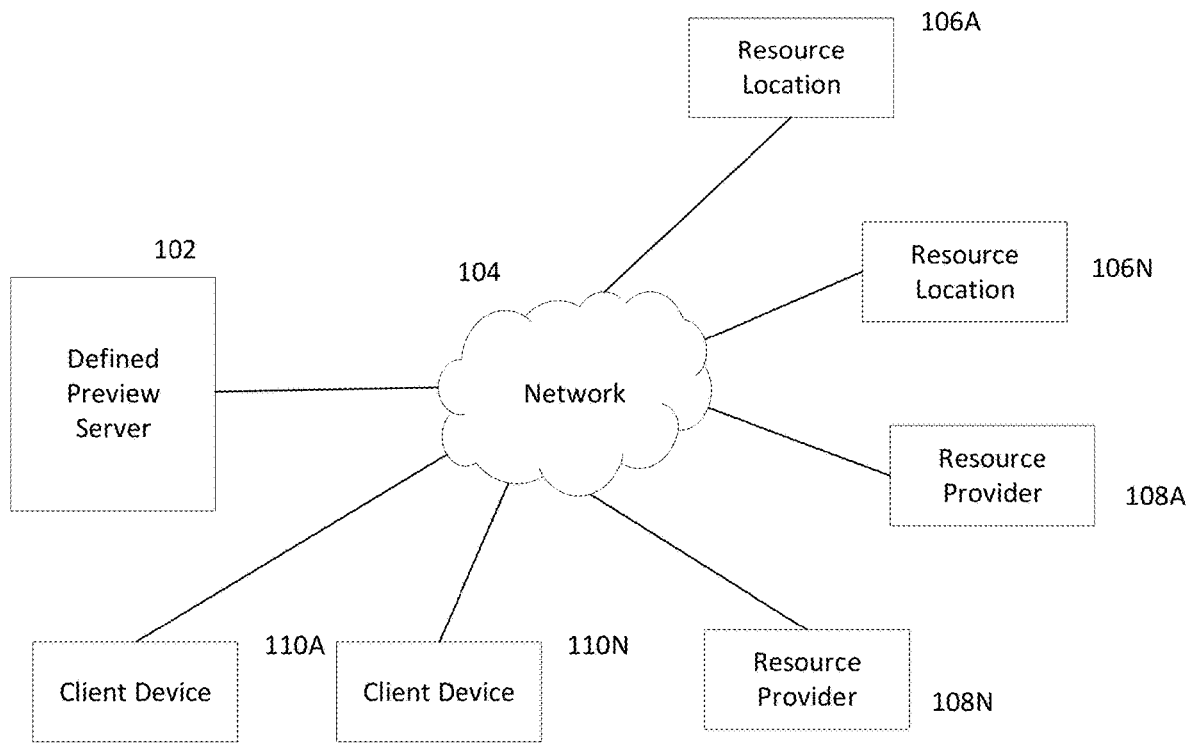
FIG. 1 illustrates a defined preview system, in accordance with some embodiments discussed herein.

Some embodiments of the present disclosure will now be described more fully hereinafter with reference to the accompanying drawings, in which some, but not all embodiments of the disclosures are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "resource," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "user" should be understood to refer to an individual, group of individuals, business, organization, and the like. The users referred to herein access a group-based communication or messaging system using client devices.

The term "client device" refers to computer hardware and/or software that is configured to access a service made available by a defined preview server. The defined preview server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to system, channel, or virtual environment that has security sufficient to be accessible only to a defined group of users. The group may be defined by common access credentials such as those of an organization or commercial enterprise. Access may further be facilitated by a validated request to join or an invitation to join transmitted by one group member user to another non-member user.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of group-based messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the term "group-based communication channel" refers to a virtual communications environment or feed that is configured to display group-based messages posted by group-based communication channel members (e.g., users, authenticated users) that are viewable only to the members of the group. The format of the group-based communication channel may appear differently to different members of the channel; however, the content of the group-based communication channel (i.e., group-based messages) will be displayed to each member of the channel. For instance, a common set of group-based messages will be displayed to each member of the respective group-based communication channel such that the content of the group-based communication channel (i.e., group-based messages) will not vary per member of the channel.

As used herein, the term "group-based message" refers to any electronically generated digital content object provided by a user using a client device and that is configured for display within a group-based communication channel. Group-based message communications may include any text (including a resource request), image, video, audio or combination thereof provided by a user (using a client device). For instance, a user may provide a group-based message that includes text as well as an image and a video within the group-based message as group-based message contents. In such a case, the text, image, and video would comprise the group-based message or digital content object. Each group-based message sent or posted to a group-based communication channel of the group-based communication system includes metadata comprising the following: a sending user identifier, a group-based message identifier, group-based message contents, a group identifier, and a group-based communication channel identifier. Each of the foregoing identifiers may comprise ASCII text, a pointer, a memory address, and the like. As used herein, the term "group-based message transmission" refers to the data representing the group-based message including a resource request that is sent from the client device to the defined preview server.

A "sending user identifier" is associated with a collection of group-based messages that are sent by a particular user (i.e., a client device and/or user profile associated with the particular user). These group-based messages may be analyzed to determine context regarding the user (e.g., the user's expertise or interest in a topic may be determined based on the frequency of mention of the topic or key words associated with the topic within such group-based messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a group-based message (e.g., access to the group-based message, such as having the group-based message return as part of search results in response to a search query, may be restricted to those users having the group identifier associated with their user profile). The group identifier may be used to determine context for the group-based message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a group-based message (e.g., access to the group-based message, such as having the group-based message return as part of search results in response to a search query, may be restricted to those users having the group-based communication channel identifier associated with their user profile, or who have the ability to join a particular group-based communication channel). The group-based communication channel identifier may be used to determine context for the group-based message (e.g., a description of the group-based communication channel, such as a description of a project discussed in the group-based communication channel, may be associated with the group-based communication channel identifier).

As used herein, the term "resource request" refers any electronically generated digital content object, such as text, which refers to an identification of a resource, such as document, image, video, web site, and the like, remote from a defined preview server and/or a client device. The resource request is generated at a client device and provided to a defined preview server in a group-based message transmission. The resource request may be a part of a group-based message. In one example, a resource request comprises a uniform resource locator (URL) identifying a requested resource and a resource address. The term "requested resource" refers to the data, content or information the resource request is requesting. The term "resource address" refers to the location of the requested resource. For example, a resource request in the form of a URL "http://logo.ACME.com" is a resource request for the "logo" of "ACME." The resource address is the address of the URL. In some examples, the resource request also comprises an intranet domain. For example, the request may include "https://intranet/documents/logo."

As used herein, the term "subscribed resource addresses" refers to one or more resource addresses that are subscribed to by a resource provider, where the resource provider receives the resource request (e.g., in the form of a defined preview request). The term "resource provider" refers to a remote networked device, such as a server or processing device, that is subscribed and configured to receive the resource requests that point to one or more resource addresses. For example, if a resource provider is subscribed to the resource address including the domain: "http://ACME.com" the resource provider will receive a defined preview request associated with the resource address domain, including the resource request: "http://logo.ACME.com." The resource provider is configured to receive defined preview requests from the defined preview server and provide defined preview data to the defined preview server in response to the defined preview requests. The defined preview data is stored or generated at the resource provider. The resource provider is also configured to receive authentication information to authenticate a defined preview request, as part of the defined preview request. The resource provider is then configured to manage and perform authentication methods utilizing the authentication information.

In some examples, the resource provider may be maintained by a user or organization. In one example, the resource provider may be maintained by the owner of an associated domain. For example, "ACME" may own the domain ACME.com. In another example, the resource provider is maintained by a third party user or organization. For example, "ACME" could maintain a resource provider subscribed to the resource address including the domain: "company.com" even if "ACME" does not own the domain. As shown herein, the subscribed resource addresses are stored as a list or registry in a subscription database. In some other examples, resource requests to resource addresses that are not subscribed will not be provided to the resource providers as a defined preview request.

As used herein, the term "defined preview request" is a data file, notification, transmission or the like provided to the resource provider that identifies the requested resource identified by a resource request, where the resource request includes a subscribed resource address. The defined preview request is provided from the defined preview server to the resource provider. The defined preview request may also include "authentication information," which refers to identification information that is configured to verify or authenticate the resource request. In one example, authentication information include an "event token" that identifies the user who requested the resource. In one example, the defined preview request also includes an identification of the group based communication channel where the resource request was received, a timestamp representing a time the resource request was received, and an identification of a resource address, wherein the identification includes a top-level-domain and a uniform resource locator.

As used herein, the term "defined preview data" refers to the text, media, metadata (including non-visual data), and other renderable data that are accessed to generate a defined preview of the requested resource as determined by the resource provider and provided to the defined preview server. For example, the resource provider may provide only an image file of the of ACME logo for the resource request: "http://logo.ACME.com." Alternatively, the resource provider may also provide textual information such as a description of the logo, legal information such as copyright and trademark information, etc. Defined preview data may be in the form of a JSON object, a URL, or other data. Additionally, the defined preview data may include other renderable data, which may comprise interactive group-based messages with user selectable items (e.g., buttons, menus, text input fields, etc.) that provide further interaction options to the user. The defined preview data is also provided from the defined preview server to a client device to enable rendering of the defined preview data on the client device interface.

As used herein, the term "defined preview" refers to a rendered visual representation of a requested source displayed on an interface of a client device. A defined preview is generated based on defined preview data, which is determined and provided by a resource provider to a defined preview server and then transmitted from the defined preview server to the client device.

As used herein, the term "metadata preview" refers to a visual representation of a requested resource based on a defined preview server's collection of metadata from the resource address at a resource location. For example, for a resource address that is not subscribed, a defined preview server will gather metadata from a resource location associated with the resource address and determine a metadata preview visual representation based on the gathered metadata. The metadata preview is rendered on the interface of the client device based on the metadata collected by the defined preview server. Since the metadata previews are based on the defined preview server's collection of metadata from a resource location, metadata previews are not defined previews.

As used herein, the term "defined preview application" (APP) refers to an additional program, such as a software module or circuitry including for example, computer readable program instructions stored on a computer readable medium. The APP updates software modules of a defined preview server, including at least a communication module and/or a resource module, in order to provide communication and other functions between the defined preview server and a resource provider. For example, the APP is also configured to subscribe a resource provider to the resource addresses by adding a resource address to the subscription database. The APP is also configured to update a communication module of the defined preview server, to handle communications such as the defined preview requests and defined preview data, between the resource provider and the group-based communication interface. The APP may be maintained by a third party such as the same third party which maintains the resource provider.

As used herein, the term "group-based communication interface instance" or "interface instance" refers to the current group-based communication interface system, channel, or virtual environment, residing on a defined preview server, receiving user input, such as a resource request. The interface instance may include multiple channels and is not limited to a certain time period. For example, a user may utilize a version or interface instance of the group-based message based interface for several days, months, or years. The term "first resource request" refers to the first time in an interface instance that the resource has been requested. The first resource request may initiate a process to install a defined preview application in order to receive the requested resource from the resource provider.

As used herein, the term "user authentication information" may comprise information positively identifying a user, client device, or user profile and may include login credentials including user name, password, and other identifying information. An "authenticated user" refers to a user requesting a resource that has also been authenticated by the resource provider. For example, the resource provider may compare an event token to user authentication information in order to authenticate a user. "Authenticated defined preview data" refers to defined preview data from a resource provider that requires an authenticated user. For example, a user may want to view a document that is protected. Thus, the event token must match the user authentication information before the preview data is provided from the resource provider.

Overview

Various embodiments of the disclosure are directed to updating a selected group-based communication interface (e.g., an interface for ACME Corp.) from a plurality of group-based communication interfaces (e.g., an interface for other organizations/companies) with a defined preview of a requested resource. The selected group-based communication interface includes a plurality of group-based communication channels (e.g., a marketing channel, sales channel, accounting channel, etc.). The selected group-based communication interface is accessible and viewable to a select group of users, such as a group of employees of a business or organization (e.g., the ACME Corp. interface would be accessible and viewable to the ACME team). The selected group-based communication interface is updated per the actions of the members of that group-based communication interface and is separate and distinct from other group-based communication interfaces (e.g., interfaces of Beta Corp. or Charlie Corp.).

Each of the plurality of group-based communication channels in the selected group-based communication interface includes one or more group-based messages, such as a group-based message including a resource request. The selected group-based communication interface is configured to allow members of the interface to communicate within group-based communication channels and across group-based communication channels to provide relevant information, including a defined preview of the requested resource, to other members efficiently and effectively. The selected group-based communication interface may be used as part of a standalone service, application, or device or it may be applied as a layer atop an existing service application or device.

As will be discussed in greater detail below, the selected group-based communication interface is configured to display a wide variety of group-based messages for any purpose that might be of interest to a user (e.g., direct group-based messages). The selected group-based communication interface may be used to visualize any set of group-based communication channels and group-based messages, including displaying defined previews of requested resources, for any purpose and it may be used in connection with numerous exemplary system architectures as explained in further detail herein.

In some embodiments, the selected group-based communication interface may be configured to be used by a business, organization, team, or other group of individuals and may be tailored to suit the respective group's interests or specific data needs. One of ordinary skill in the art will appreciate that the concepts discussed herein may be applied to better visualize group-based messages including defined previews of a requested resource on a selected group-based communication interface.

Exemplary Architecture

FIG. 1 shows system 100 including an example network architecture for a defined preview system, which may include one or more devices and sub-systems that are configured to implement some embodiments discussed herein. For example, system 100 may include defined preview server 102, which can include, for example, the circuitry disclosed in FIG. 2, a defined preview server, or database, among other things (not shown). The defined preview server 102 may include any suitable network server and/or other type of processing device. In some embodiments, the defined preview server 102 may determine and transmit commands and instructions for rendering one or more group-based communication channels, including defined previews of resources, to client devices 110A-110N.

Defined preview server 102 can communicate with one or more client devices 110A-110N via network 104. In this regard, network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel.

Client devices 110A-110N and/or defined preview server 102 may each be implemented as a personal computer and/or other networked device, such as a cellular phone, tablet computer, mobile device, or any other computer device that may be used for any suitable purpose in addition to displaying a defined preview of a resource in a group-based communication interface.

The depiction in FIG. 1 of "N" members is merely for illustration purposes. Any number of members may be included in the system 100 so long as the members have the proper credentials for accessing the selected group-based communication interface. In one embodiment, the client devices 110A-110N may be configured to display a group-based communication interface on a display of the client device for viewing, creating, editing, and/or otherwise interacting with at least one group-based communication channel, which may be provided by the defined preview server 102. According to some embodiments, the defined preview server 102 may be configured to display the group-based communication interface on a display of the defined preview server 102 for viewing, creating, editing, and/or otherwise interacting with a group-based communication channel. In some embodiments, a group-based communication interface of a client device 110A-110N may be different from a group-based communication interface of a defined preview server 102. The client devices 110A-110N may be used in addition to or instead of the defined preview server 102. System 100 may also include additional client devices and/or servers, among other things.

Defined preview server 102 can also communicate with resource locations 106A-106N and resource providers 108A-108N via network 104. Resource locations 106A-106 represent database or other data repositories hosting resource addresses that are not subscribed to by a resource provider. Resource providers 108A-108N represent networked devices such as a computer or other resource, maintained by a third party, and configured to receive defined preview requests from defined preview server 102 and provide defined preview data to defined preview server 102.

In some embodiments of the system 100, a group-based message transmission compromising a group-based message may be sent from a client device 110A-110N to defined preview server 102. In various implementations, the group-based message transmission is sent to the defined preview server 102 over network 104 directly by a client device 110A-110N, the group-based message is sent to the defined preview server 102 via an intermediary such as a defined preview server, and/or the like. In one example, a group-based message may be inputted into group-based communication interface rendered on a client device using interface module 246, the group-based message being inputted by a user in conjunction with input/output module 250. The group-based message transmission is then determined and provided by communication module 248 to the defined preview server 102 and received by communication module 212 at defined preview server 102. In one implementation, the group-based message transmission received by defined preview server 102 includes a resource request along with group-based message information data such as a group-based message identifier, sending user identifier, a group identifier, a group-based communication channel identifier, group-based message contents (e.g., text, emojis, images, links), attachments (e.g., files), group-based message hierarchy data (e.g., the group-based message may be a reply to another group-based message), third party metadata, and/or the like. In one embodiment, the client device 110A-110N may provide the following example group-based message, substantially in the form of a (Secure) Hypertext Transfer Protocol ("HTTP(S)") POST group-based message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further group-based messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name> </app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
```

```
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <group-based message>
        <group-based message_identifier>ID_group-based message_10</group-based message_identifier>
        <team_identifier>ID_team_1</team_identifier>
        <channel_identifier>ID_channel_1</channel_identifier>
        <contents>This a copy of the document.</contents>
        <attachments>technical_document.doc</attachments>
    </group-based message>
</auth_request>
```

The defined preview server 102 then, using group-based message module 216, may create a storage group-based message based upon the received group-based message to facilitate group-based message indexing and storage in a group-based communication repository. In one implementation, the storage group-based message transmission may include data such as a group-based message identifier, a group identifier, a group-based communication channel identifier, a sending user identifier, topics, responses, group-based message contents, attachments, group-based message hierarchy data, third party metadata, conversation primitive data, and/or the like. For example, the defined preview server 102, using group-based message module 216, may provide the following example storage group-based message, substantially in the form of a HTTP(S) POST group-based message including XML-formatted data, as provided below:

```
POST /storage_group-based message.php HTTP/1.1
Host: www.server.com
Content-Type: Application/XML
Content-Length: 667
<?XML version = "1.0" encoding = "UTF-8"?>
<storage_group-based message>
    <group-based message_identifier>ID_group-based message_10</group-based message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>technical</topic>
        <topic>documents</topic>
    </topics>
```

-continued

```
<responses>
    <response>liked by ID_user_2</response>
    <response>starred by ID_user_3</response>
</responses>
<contents> Here's the link to the shared document:
https://doc.ACME.com/12345.</contents>
    <attachments></attachments>
    <conversation_primitive>
        conversation includes group-based messages: ID_group-based message_8,
ID_group-based message_9, ID group-based message_10,
        ID_group-based message_11, ID group-based message_12
    </conversation_primitive>
</storage_group-based message>
```

In embodiments, a group identifier as defined above may be associated with the group-based message.

In embodiments, a group-based communication channel identifier as defined above may be associated with the group-based message.

In embodiments, a sending user identifier as defined above may be associated with the group-based message. In one implementation, the group-based message may be parsed (e.g., using PHP commands) to determine a sending user identifier of the user who sent the group-based message.

In embodiments, topics may be associated with the group-based message. In one implementation, the group-based message contents may be parsed (e.g., using PHP commands) to determine topics discussed in the group-based message. For example, hashtags in the group-based message may indicate topics associated with the group-based message. In another example, the group-based message may be analyzed (e.g., by itself, with other group-based messages in a conversation primitive) or parsed using a machine learning technique, such as topic modeling, to determine topics associated with the group-based message.

Figure 5:
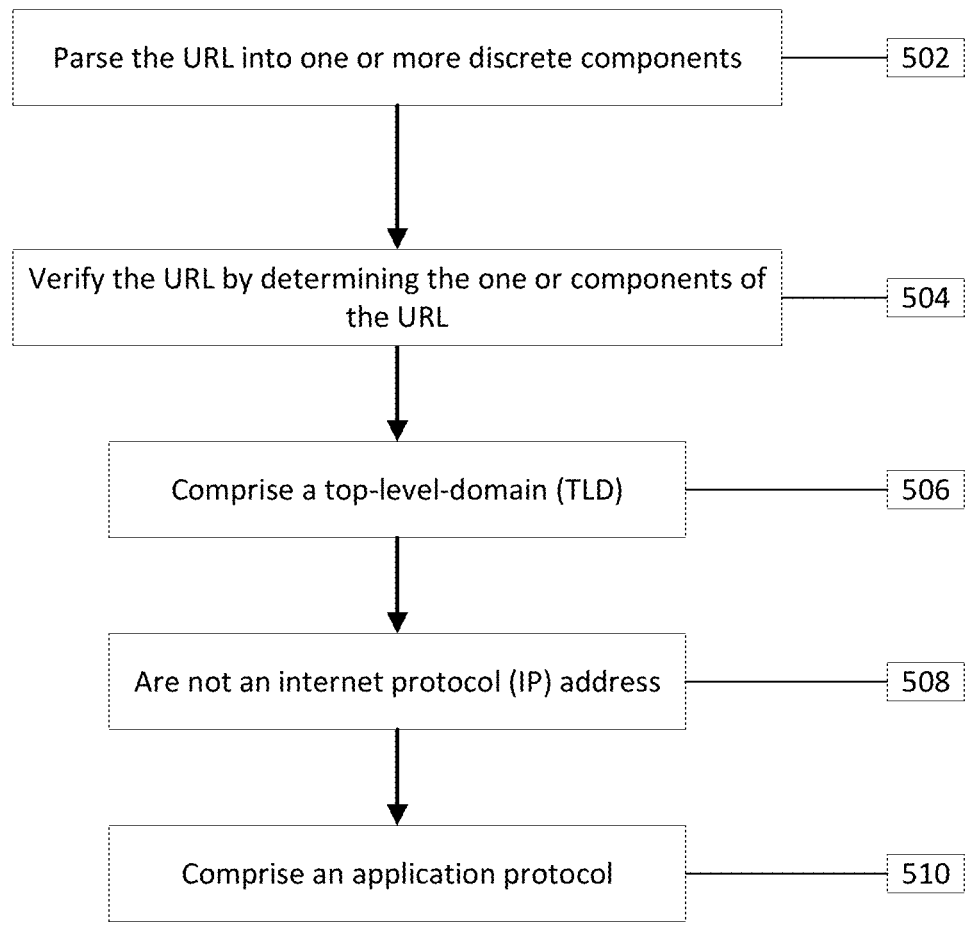
FIG. 5 illustrates a flow diagram for processing of a URL in accordance with some embodiments discussed herein.

In one implementation, the group-based message contents may be parsed (e.g., using PHP commands) to determine a resource request in the group-based message in the group-based message transmission as described herein and in relation to FIG. 5.

In embodiments, data indicating responses may be associated with the group-based message. For example, responses to the group-based message by other users may include reactions (e.g., selection of an emoji associated with the group-based message, selection of a "like" button associated with the group-based message), clicking on a hyperlink embedded in the group-based message, replying to the group-based message (e.g., posting a group-based message to the group-based communication channel in response to the group-based message), downloading a file associated with the group-based message, sharing the group-based message from one group-based communication channel to another group-based communication channel, pinning the group-based message, starring the group-based message, and/or the like. In one implementation, data regarding responses to the group-based message by other users may be included with the group-based message, and the group-based message may be parsed by group-based message module 216 (e.g., using PHP commands) to determine the responses. In another implementation, data regarding responses to the group-based message may be retrieved by messaging module 216 from a database. For example, data regarding responses to the group-based message may be retrieved by group-based message module 216 via a MySQL database command similar to the following:

SELECT group-based messageResponses
FROM MSM_Group-based message
WHERE group-based messageID=ID_group-based message_10.

For example, data regarding responses to the group-based message may be used by group-based message module 216 to determine context for the group-based message (e.g., a social score for the group-based message from the perspective of some user). In another example, data regarding responses to the group-based message may be analyzed to determine context regarding the user (e.g., the user's expertise in a topic may be determined based on the responses to the user's group-based message regarding the topic).

In embodiments, attachments, such as attachment 307, may be included with the group-based message. If there are attachments, files may be associated with the group-based message. In one implementation, the group-based message may be parsed by group-based message module 216 (e.g., using PHP commands) to determine file names of the attachments. For example, file contents may be analyzed to determine context for the group-based message (e.g., a technical document may indicate that the group-based message is associated with the "technical document" category). As described herein, an attachment is not a requested resource since the entire file is provided from a client device in a group-based message transmission and stored/accessible on the defined-preview server.

In embodiments, third party metadata, which may include a third party maintained by a resource provider or another third party, may be associated with the group-based message. For example, third party metadata may provide additional context regarding the group-based message or the user that is specific to a company, group, group-based communication channel, and/or the like. In one implementation, the group-based message may be parsed (e.g., using PHP commands) to determine third party metadata. For example, third party metadata may indicate whether the user who sent the group-based message is an authorized representative of the group-based communication channel (e.g., an authorized representative may be authorized by the company to respond to questions in the group-based communication channel).

In embodiments, a conversation primitive may be associated with the group-based message by group-based message module 216. In one implementation, a conversation primitive is an element used to analyze, index, store, and/or the like group-based messages. For example, the group-based message may be analyzed by itself, and may form its own conversation primitive. In another example, the group-based message may be analyzed along with other group-based messages that make up a conversation, and the group-based messages that make up the conversation may form a conversation primitive. In one implementation, the conversation primitive may be determined as the group-based message, a specified number (e.g., two) of preceding group-based messages and a specified number (e.g., two) of following group-based messages. In another implementation, the conversation primitive may be determined based on analysis of topics discussed in the group-based message and other group-based messages (e.g., in the channel) and/or proximity (e.g., group-based message send order proximity, group-based message send time proximity) of these group-based messages.

In embodiments, various metadata, determined as described above, and/or the contents of the group-based message may be used by group-based message module 216 to index the group-based message (e.g., using the conversation primitive) to facilitate various facets of searching (i.e., search queries that return results from a group-based communication repository). In one implementation, a storage group-based message may be sent from defined preview server 102 by communication module 212 to facilitate indexing in group-based communication repository. In another implementation, metadata associated with the group-based message may be determined by group-based message module 216 and the group-based message may be indexed in group-based communication repository. In one embodiment, the group-based message may be indexed such that a company's or a group's group-based messages are indexed separately (e.g., in a separate index associated with the group and/or company that is not shared with other groups and/or companies). In one implementation, group-based messages may be indexed at a separate distributed repository (e.g., to facilitate data isolation for security purposes).

If there are attachments associated with the group-based message, file contents of the associated files may be used to index such files in a group-based communication repository to facilitate searching. In one embodiment, the files may be indexed such that a company's or a group's files are indexed at a separate distributed repository.

Figure 2A:
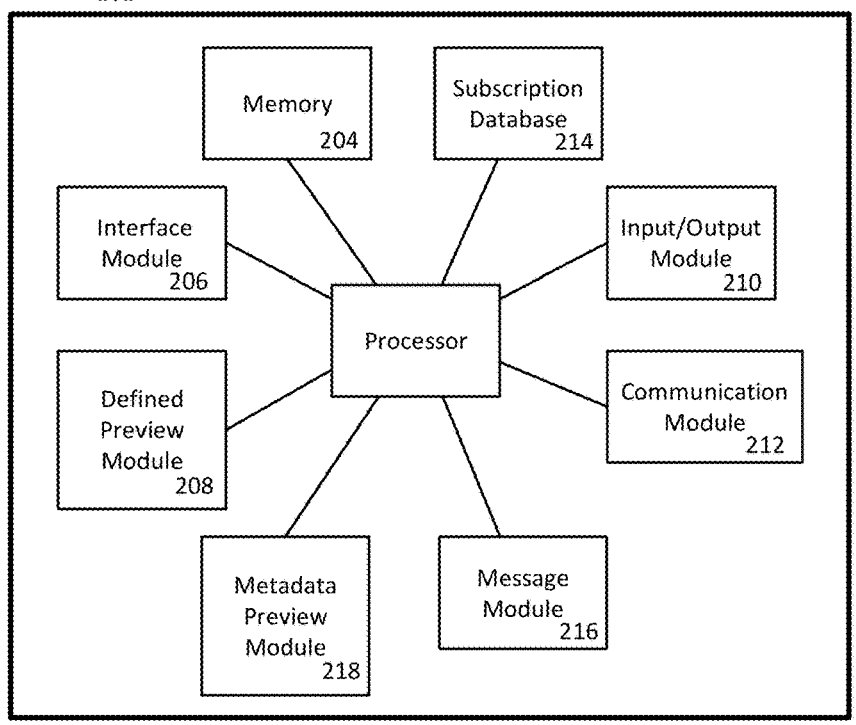
FIG. 2A illustrates a schematic block diagram of a defined preview server in accordance with some embodiments discussed herein.

FIG. 2A shows a schematic block diagram of circuitry of server 102, some or all of which may be included in, for example, defined preview server 102, such as a defined preview server. Any of the aforementioned systems or devices may be configured to, either independently or jointly with other devices in a network 104 perform the functions of the circuitry of server 102 described herein. As illustrated in FIG. 2A, in accordance with some example embodiments, circuitry of server 102 can includes various means, such as processor 202, memory 204, interface module 206, defined preview module 208, communications module 212, message module 216, metadata preview module 218 and/or input/output module 210. In some embodiments, subscription database 214 may also or instead be included. As referred to herein, "module" includes hardware, software and/or firmware configured to perform one or more particular functions. In this regard, the means of circuitry of server 102 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2A as a single processor, in some embodiments processor 202 comprises a plurality of processors. The plurality of processors may be embodied on a single computing device or may be distributed across a plurality of computing devices collectively configured to function as circuitry of server 102.

The plurality of processors may be in operative communication with each other and may be collectively configured to perform one or more functionalities of circuitry of server 102 as described herein. In an example embodiment, processor 202 is configured to execute instructions stored in memory 204 or otherwise accessible to processor 202. These instructions, when executed by processor 202, may cause circuitry of server 102 to perform one or more of the functionalities of circuitry of server 102 as described herein.

Whether configured by hardware, firmware/software methods, or by a combination thereof, processor 202 may comprise an entity capable of performing operations according to embodiments of the present disclosure while configured accordingly. Thus, for example, when processor 202 is embodied as an ASIC, FPGA or the like, processor 202 may comprise specifically configured hardware for conducting one or more operations described herein. Alternatively, as another example, when processor 202 is embodied as an executor of instructions, such as may be stored in memory 204, the instructions may specifically configure processor 202 to perform one or more algorithms and operations of the defined preview server described herein, such as those discussed in connection with FIGS. 3-8.

Memory 204 may comprise, for example, volatile memory, non-volatile memory, or some combination thereof. Although illustrated in FIG. 2A as a single memory, memory 204 may comprise a plurality of memory components. The plurality of memory components may be embodied on a single computing device or distributed across a plurality of computing devices. In various embodiments, memory 204 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 204 may be configured to store information, data (including item data and/or profile data), applications, instructions, or the like for enabling circuitry of server 102 to carry out various functions in accordance with example embodiments of the present disclosure. For example, in at least some embodiments, memory 204 is configured to buffer input data for processing by processor 202. Additionally or alternatively, in at least some embodiments, memory 204 is configured to store program instructions for execution by processor 202. Memory 204 may store information in the form of static and/or dynamic information. This stored information may be stored and/or used by circuitry of server 102 during the course of performing its functionalities.

Communication module 212 may be embodied as any device or means embodied in circuitry, hardware, a computer program product comprising computer readable program instructions stored on a computer readable medium (e.g., memory 204 or a non-transitory computer readable medium) and executed by a processing device (e.g., processor 202), or a combination thereof that is configured to receive and/or transmit data from/to another device and/or network, such as, for example, a second circuitry of server 102 and/or the like. In some embodiments, communications module 212 (like other components discussed herein) can be at least partially embodied as or otherwise controlled by processor 202. In this regard, communications module 212 may be in communication with processor 202, such as via a bus. Communications module 212 may include, for example, an antenna, a transmitter, a receiver, a transceiver, network interface card and/or supporting hardware and/or firmware/software for enabling communications with another computing device. Communications module 212 may be configured to receive and/or transmit any data that may be stored by memory 204 using any protocol that may be used for communications between computing devices. Communications module 212 may additionally or alternatively be in communication with the memory 204, input/output module 210 and/or any other component of circuitry of server 102, such as via a bus.

Input/output module 210 may be in communication with processor 202 to receive an indication of a user input and/or to provide an audible, visual, mechanical, or other output to a user (e.g., provider and/or consumer). Some example visual outputs (e.g. a defined preview of a requested resource) that may be provided to a user by circuitry of server 102 are discussed in connection with FIGS. 3-8. As such, input/output module 210 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry of server 102 is embodied as a server or database, aspects of input/output module 210 may be reduced as compared to embodiments where circuitry of server 102 is implemented as an end-user machine (e.g., consumer device and/or provider device) or other type of device designed for complex user interactions.

In some embodiments (like other components discussed herein), input/output module 210 may even be eliminated from circuitry of server 102. Alternatively, such as in embodiments wherein circuitry of server 102 is embodied as a server or database, at least some aspects of input/output module 210 may be embodied on an apparatus (e.g. a client device) used by a user that is in communication with circuitry of server 102. Input/output module 210 may be in communication with the memory 204, communications module 212, and/or any other component(s), such as via a bus. One or more than one input/output module and/or other component can be included in circuitry of server 102.

Subscription database 214 may also or instead be included and configured to perform the functionality discussed herein related to subscribed resource addresses. In some embodiments, some or all of the functionality of displaying a defined preview of a resource in group-based communication channels may be performed by processor 202. Additionally, interface module 206, defined preview module 208, and group-based message module 216 may be configured to perform the functionality of the processes described herein. In this regard, the example processes and algorithms discussed herein can be performed by at least one processor 202, in conjunction with modules 206, 208, 210, 212, and 216. For example, non-transitory computer readable media can be configured to store firmware, one or more application programs, and/or other software, which include instructions and other computer-readable program code portions that can be executed to control each processor (e.g., processor 202) of the components of circuitry of server 102 to implement various operations, including the examples shown above. As such, a series of computer-readable program code portions are embodied in one or more computer program goods and can be used, with a computing device, server, and/or other programmable apparatus, to produce machine-implemented processes.

Figure 2B:
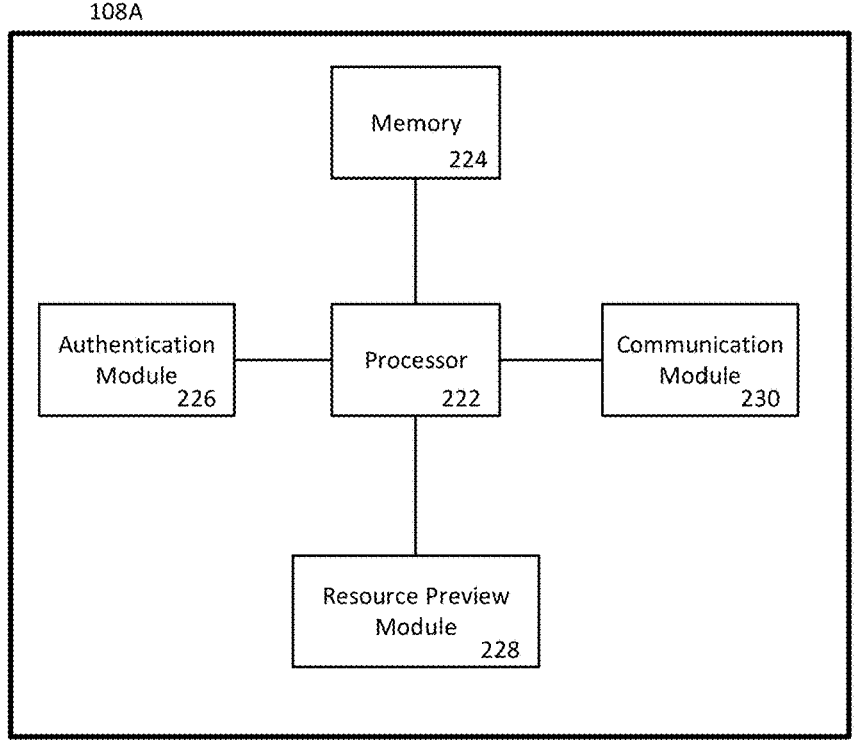
FIG. 2B illustrates a schematic block diagram of a resource provider in accordance with some embodiments discussed herein.

FIG. 2B shows a schematic block diagram of circuitry of resource provider 108A, some or all of which may be included in, for example, resource providers 108A-108N. As illustrated in FIG. 2B, in accordance with some example embodiments, circuitry of resource provider 108A can include various means, such as processor 222, memory 224, authentication module 226, communications module 230, and/or resource preview module 228. As referred to herein, "module" includes hardware, software and/or firmware configured to perform one or more particular functions. In this regard, the means of circuitry of resource provider 108A as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 224) that is executable by a suitably configured processing device (e.g., processor 222), or some combination thereof.

Processor 222 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2B as a single processor, in some embodiments processor 222 comprises a plurality of processors. The plurality of processors may be embodied on a single computing device or may be distributed across a plurality of computing devices collectively configured to function as circuitry of resource provider 108A.

The plurality of processors may be in operative communication with each other and may be collectively configured to perform one or more functionalities of circuitry of resource provider 108A as described herein. In an example embodiment, processor 222 is configured to execute instructions stored in memory 204 or otherwise accessible to processor 222. These instructions, when executed by processor 222, may cause circuitry of resource provider 108A to perform one or more of the functionalities of circuitry of resource provider 108A as described herein.

Whether configured by hardware, firmware/software methods, or by a combination thereof, processor 222 may comprise an entity capable of performing operations according to embodiments of the present disclosure while configured accordingly. Thus, for example, when processor 222 is embodied as an ASIC, FPGA or the like, processor 222 may comprise specifically configured hardware for conducting one or more operations described herein. Alternatively, as another example, when processor 222 is embodied as an executor of instructions, such as may be stored in memory 224, the instructions may specifically configure processor 222 to perform one or more algorithms and operations of the resource provider described herein, such as those discussed in connection with FIGS. 3-8.

Memory 224 may comprise, for example, volatile memory, non-volatile memory, or some combination thereof. Although illustrated in FIG. 2 as a single memory, memory 224 may comprise a plurality of memory components. The plurality of memory components may be embodied on a single computing device or distributed across a plurality of computing devices. In various embodiments, memory 224 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 224 may be configured to store information, data (including item data and/or profile data), applications, instructions, or the like for enabling circuitry of resource provider 108A to carry out various functions in accordance with example embodiments of the present disclosure. For example, in at least some embodiments, memory 224 is configured to buffer input data for processing by processor 222. Additionally or alternatively, in at least some embodiments, memory 224 is configured to store program instructions for execution by processor 222. Memory 224 may store information in the form of static and/or dynamic information. This stored information may be stored and/or used by circuitry of resource provider 108A during the course of performing its functionalities.

Communication module 230 may be embodied as any device or means embodied in circuitry, hardware, a computer program product comprising computer readable program instructions stored on a computer readable medium (e.g., memory 224 or a non-transitory computer readable medium) and executed by a processing device (e.g., processor 222), or a combination thereof that is configured to receive and/or transmit data from/to another device and/or network, such as, for example, a second circuitry of resource provider 108A and/or the like. In some embodiments, communications module 230 (like other components discussed herein) can be at least partially embodied as or otherwise controlled by processor 222. In this regard, communications module 230 may be in communication with processor 222, such as via a bus. Communications module 230 may include, for example, an antenna, a transmitter, a receiver, a transceiver, network interface card and/or supporting hardware and/or firmware/software for enabling communications with another computing device. Communications module 230 may be configured to receive and/or transmit any data that may be stored by memory 224 using any protocol that may be used for communications between computing devices. Communications module 230 may additionally or alternatively be in communication with the memory 224, and/or any other component of circuitry of resource provider 108A, such as via a bus.

In this regard, the example processes and algorithms discussed herein can be performed by at least one processor 222, in conjunction with modules 226, 228, and 230. For example, non-transitory computer readable media can be configured to store firmware, one or more application programs, and/or other software, which include instructions and other computer-readable program code portions that can be executed to control each processor (e.g., processor 222) of the components of circuitry of resource provider 108A to implement various operations of the resource provider, including the examples shown above. As such, a series of computer-readable program code portions are embodied in one or more computer program goods and can be used, with a computing device, server, and/or other programmable apparatus, to produce machine-implemented processes.

Figure 2C:
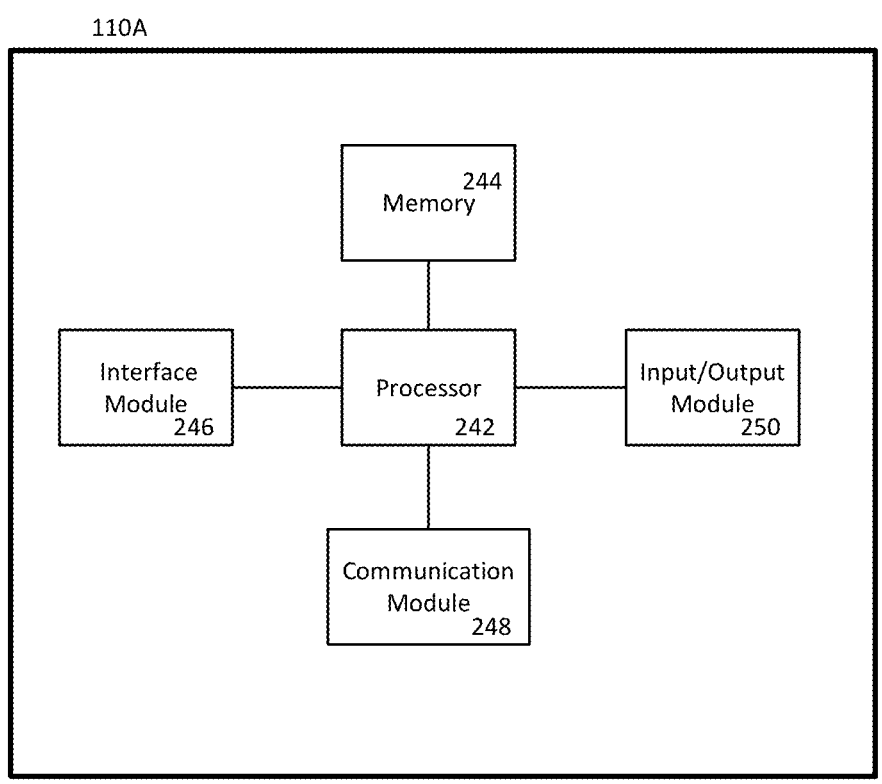
FIG. 2C illustrates a schematic block diagram of a client device in accordance with some embodiments discussed herein.

FIG. 2C shows a schematic block diagram of circuitry of client device 110A, some or all of which may be included in, for example, client devices 110A-110N. As illustrated in FIG. 2C, in accordance with some example embodiments, circuitry of client device 110A can includes various means, such as processor 242, memory 244, interface module 246, communication module 248, and/or input/output module 250. As referred to herein, "module" includes hardware, software and/or firmware configured to perform one or more particular functions. In this regard, the means of circuitry of client device 110A as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 244) that is executable by a suitably configured processing device (e.g., processor 242), or some combination thereof.

Processor 242 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2C as a single processor, in some embodiments processor 242 comprises a plurality of processors. The plurality of processors may be embodied on a single computing device or may be distributed across a plurality of computing devices collectively configured to function as circuitry of client device 110A.

The plurality of processors may be in operative communication with each other and may be collectively configured to perform one or more functionalities of circuitry of client device 110A as described herein. In an example embodiment, processor 242 is configured to execute instructions stored in memory 244 or otherwise accessible to processor 242. These instructions, when executed by processor 242, may cause circuitry of client device 110A to perform one or more of the functionalities of circuitry of client device 110A as described herein.

Whether configured by hardware, firmware/software methods, or by a combination thereof, processor 242 may comprise an entity capable of performing operations according to embodiments of the present disclosure while configured accordingly. Thus, for example, when processor 242 is embodied as an ASIC, FPGA or the like, processor 242 may comprise specifically configured hardware for conducting one or more operations described herein. Alternatively, as another example, when processor 242 is embodied as an executor of instructions, such as may be stored in memory 244, the instructions may specifically configure processor 242 to perform one or more algorithms and operations of a client device as described herein, such as those discussed in connection with FIGS. 3-8.

Memory 244 may comprise, for example, volatile memory, non-volatile memory, or some combination thereof. Although illustrated in FIG. 2C as a single memory, memory 244 may comprise a plurality of memory components. The plurality of memory components may be embodied on a single computing device or distributed across a plurality of computing devices. In various embodiments, memory 244 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 244 may be configured to store information, data (including item data and/or profile data), applications, instructions, or the like for enabling circuitry of client device 110A to carry out various functions in accordance with example embodiments of the present disclosure. For example, in at least some embodiments, memory 244 is configured to buffer input data for processing by processor 242. Additionally or alternatively, in at least some embodiments, memory 244 is configured to store program instructions for execution by processor 242. Memory 244 may store information in the form of static and/or dynamic information. This stored information may be stored and/or used by circuitry of client device 110A during the course of performing its functionalities.

Communication module 248 may be embodied as any device or means embodied in circuitry, hardware, a computer program product comprising computer readable program instructions stored on a computer readable medium (e.g., memory 204 or a non-transitory computer readable medium) and executed by a processing device (e.g., processor 242), or a combination thereof that is configured to receive and/or transmit data from/to another device and/or network, such as, for example, a second circuitry of client device 110A and/or the like. In some embodiments, communications module 212 (like other components discussed herein) can be at least partially embodied as or otherwise controlled by processor 242. In this regard, communications module 212 may be in communication with processor 242, such as via a bus. Communications module 248 may include, for example, an antenna, a transmitter, a receiver, a transceiver, network interface card and/or supporting hardware and/or firmware/software for enabling communications with another computing device. Communications module 248 may be configured to receive and/or transmit any data that may be stored by memory 244 using any protocol that may be used for communications between computing devices. Communications module 248 may additionally or alternatively be in communication with the memory 244, input/output module 250 and/or any other component of circuitry of server 102, such as via a bus.

Input/output module 250 may be in communication with processor 242 to receive an indication of a user input and/or to provide an audible, visual, mechanical, or other output to a user (e.g., provider and/or consumer). Some example visual outputs (e.g. a defined preview of a requested resource) that may be provided to a user by circuitry of client device 110A are discussed in connection with FIGS. 3-8. As such, input/output module 210 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry of client device 110A is embodied as a server or database, aspects of input/output module 250 may be reduced as compared to embodiments where circuitry of client device 110A is implemented as an end-user machine (e.g., consumer device and/or provider device) or other type of device designed for complex user interactions.

As will be appreciated regarding FIGS. 2A-C, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry of server 102, resource provider 108A, and/or of client device 110A. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present disclosure have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202, discussed above with reference to FIG. 2A, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Defined Previews

Figure 3A:
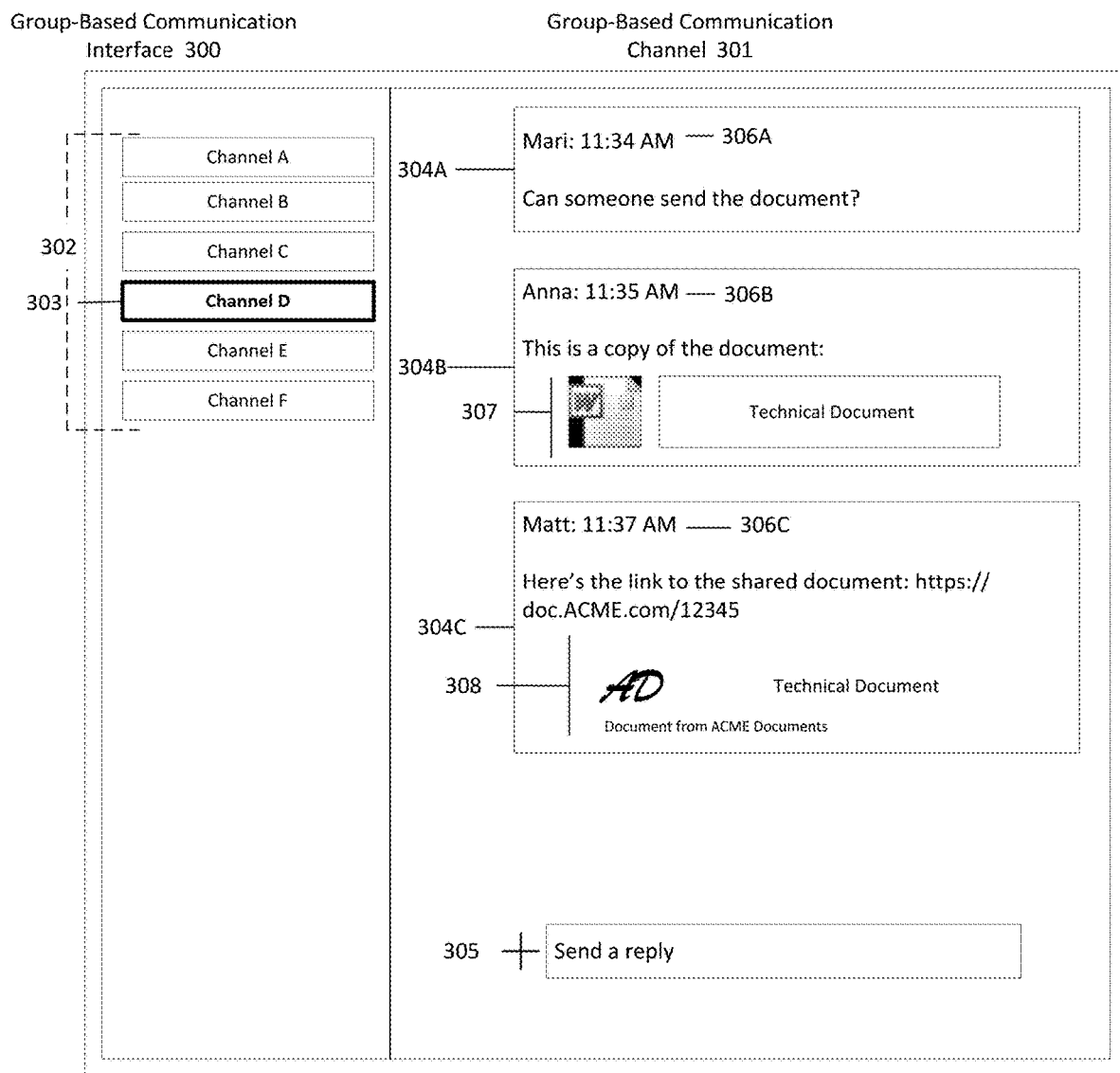

FIG. 3A illustrates an example group-based communication interface 300 structured in accordance with various embodiments of the disclosure. As described herein, group-based communication interface 300 is presented on a display of client device 110A using at least interface module 246 and provides interaction with a user using at least input/output module 250. The depicted group-based communication interface 300 includes multiple group based communication channels 302, displayed on a client device 110a utilizing interface module 246. Group-based messages are presented in a selected group-based communication channel 303 (Channel D) and include group-based messages 304A-C. Each group-based message comprises group-based message information 306A-306C, which, as illustrated, identifies the user who inputted the group-based message and a timestamp of when the group-based message was inputted. In the example embodiment, the group-based messages are uniformly presented to each of the users viewing the group-based messages in the selected channel. For the purposes described herein, the user inputs a group-based message utilizing input field 305 and input/output circuitry 250. For example, the user (Matt) inputs or enters "Here's the link to the shared document: https://doc.ACME.com/12345" into input field 305.

As shown in FIG. 3A, group-based message 304B includes an attachment 307 such as a text document. In this example, the entire attachment (e.g., the document) is presented in the channel and thus a defined preview is not generated.

In contrast, group-based message 304C comprises a resource request in the form of URL "https://doc.ACME.com/12345." In the depicted embodiment, the resource location requires authentication before a resource preview can be fully shown. The currently depicted interface instance lacks software needed to properly authenticate the resource located at the depicted resource location. Thus, a metadata preview of the resource is displayed based on metadata and other information collected by the defined preview server 102. For example, a logo of the document service, a title, and a description of the document are shown in metadata preview 308.

Figure 3B:
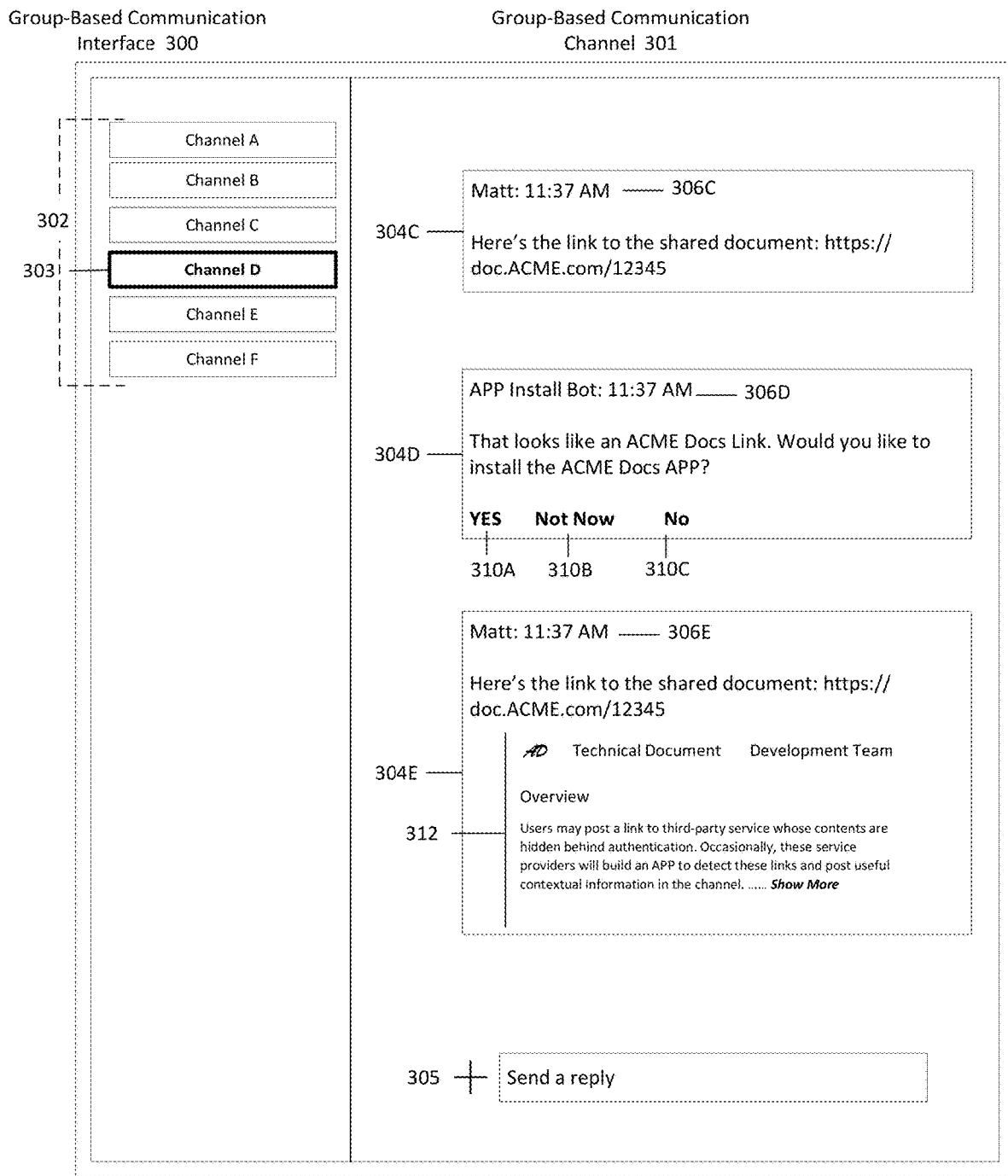
Figure 6:
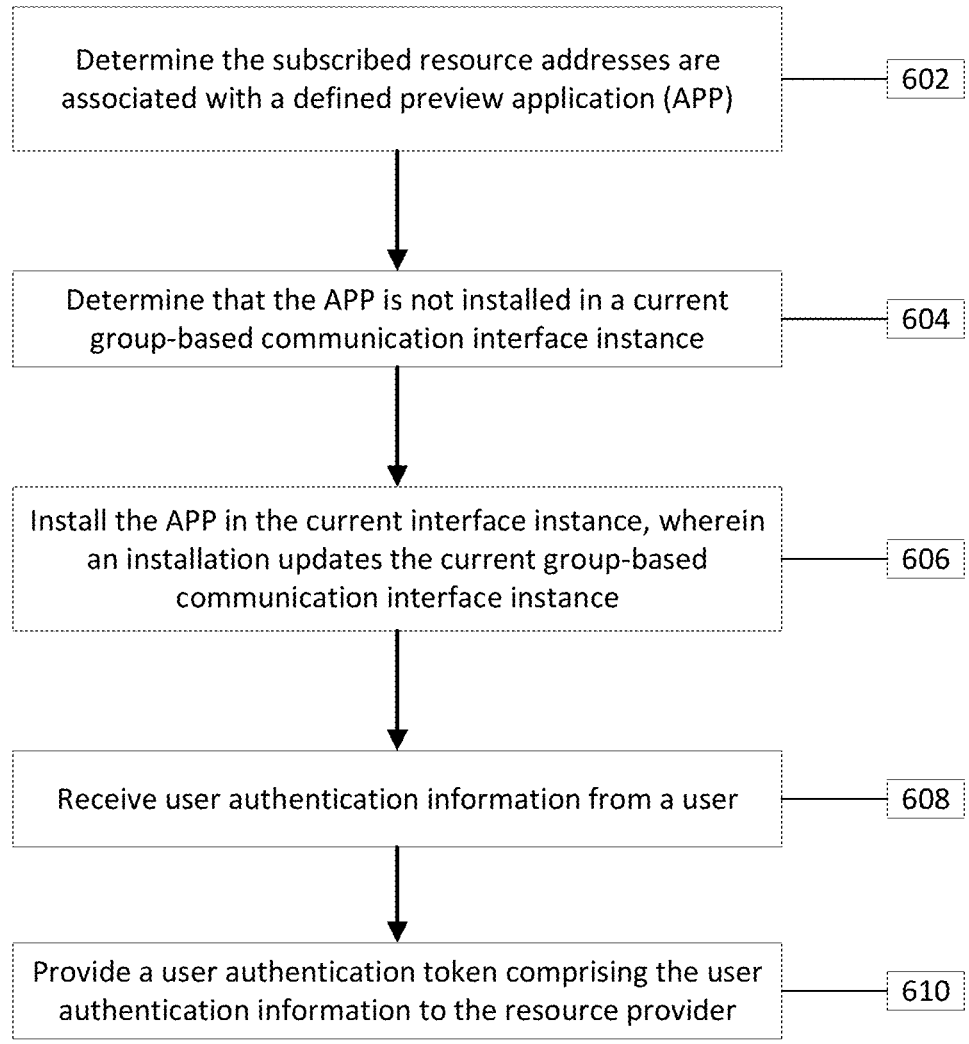
FIG. 6 illustrates a flow diagram for installing a defined preview application and providing user authentication information in accordance with some embodiments discussed herein.

As shown in FIG. 3B, the defined preview server 102 determines, using defined preview module 208, that the resource request (e.g., "https://doc.ACME.com/12345") is a subscribed resource according to the operations described in FIGS. 4-8 and that a defined preview application (APP) such as the ACME Docs APP is not installed on the interface instance (e.g. the defined preview server 102) as described in FIG. 6. In some examples, the server then provides the opportunity to install the APP in the interface instance (e.g., installing the APP on the defined preview server 102) as shown in group-based message 304D.

In some examples, the install procedure for an APP is configured by a third party maintaining the resource provider (e.g., the ACME Docs APP is maintained by the owner of ACME.com or another third party). In some examples, the APP install procedure includes a standard install procedure. In some other examples, the APP will be automatically installed on defined preview server 102, upon receipt of a subscribed resource request. A user then select options 310A, 310B or 310C in the group-based message 304D. In some examples, the installation of an APP will update the software modules of defined preview server 102, including at least defined preview module 208 and communication module 212 to handle resource requests associated with one or more subscribed resource addresses and handle the defined preview data provided by the resource provider.

Upon installation of the APP in the interface instance on defined preview server 102, the defined preview server 102 transmits a defined preview request to the resource provider and receive defined preview data. The defined preview server 102 then renders the defined preview data as defined preview 312, using interface module 206 and/or defined preview module 208. The defined preview 312 is also provided to client device 110A such that interface module 246 displays the defined preview on the group-based communication interface on client device 110A.

FIG. 3C shows an example of the group-based message in the channel if an APP was previously installed in the interface instance. For example, the ACME Docs APP is already installed in the interface instance on the defined preview server 102, thus defined preview module 208 and communication circuitry 212 sends a defined preview request to the resource provider and the defined preview data is received and rendered as defined preview 312, without needing to install (or reinstall) the APP.

Defined preview 312 includes image 314 (e.g., a logo of a document hosting service or another image as defined at the resource provider), description text 316 and 318 (e.g., a title and authors of the document). Defined preview 312 also includes summary text 320, which summarizes or depicts the information in the resource. The defined preview 312 also includes the interactive graphical element 322, which allows for a user to select the element for further user interface functions. For example, selecting element 322 shows more or less summary text 320. In some examples, the elements 314-322 are all selected and configured by the resource provider. In some examples, defined preview 312 includes property limitations which determine how the defined preview is displayed. For example, the restrictions includes a restriction on the length of a title (such as description text 316 and 318), as well as restrictions on the size of images (such as image 314), and/or length of summary text 320, as well as restrictions on other display properties of the defined preview.

Example Operations for Displaying a Defined Preview of Resource

Figure 4:
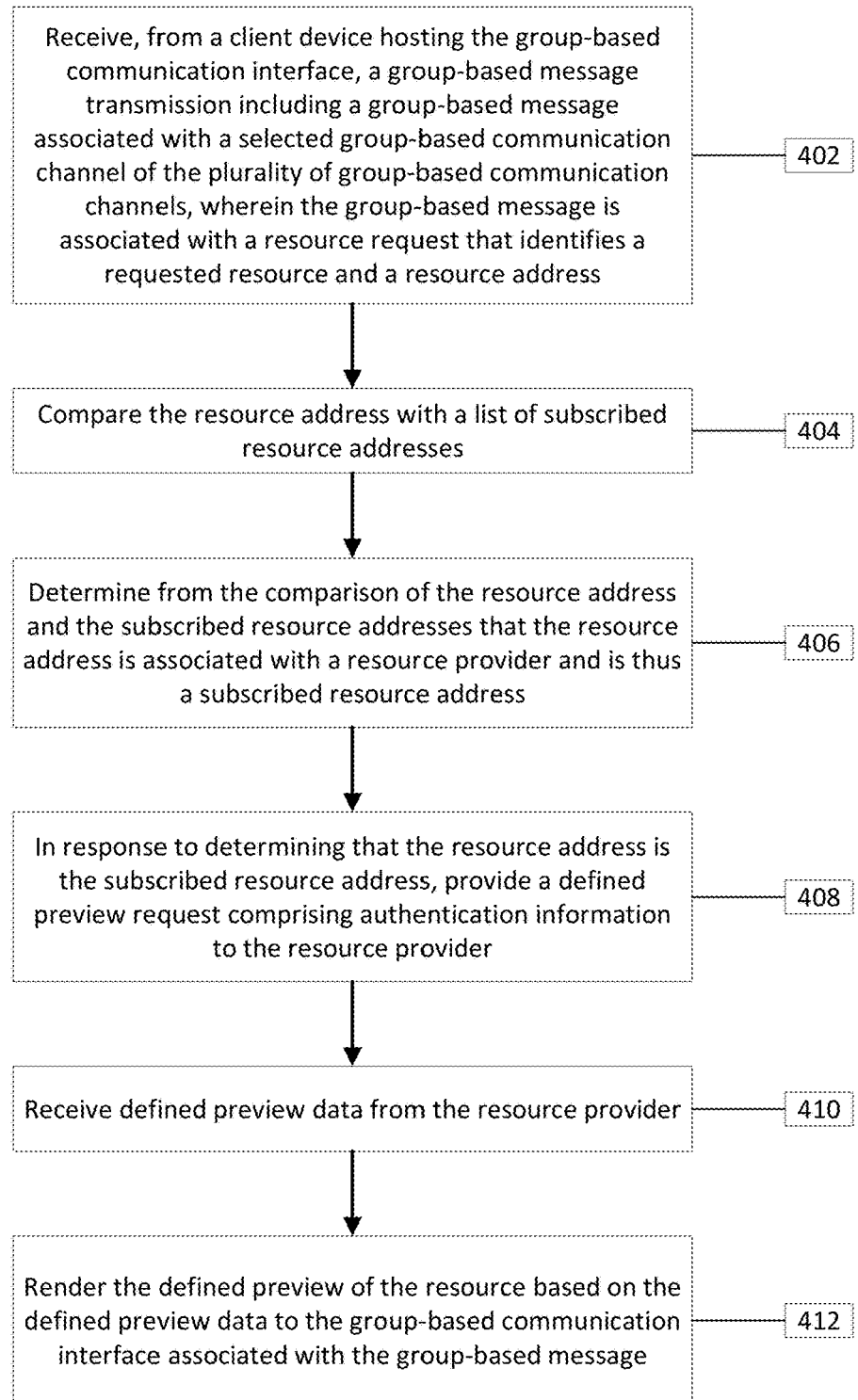
FIG. 4 illustrates a flow diagram for rendering a defined preview in a group-based communication interface in accordance with some embodiments discussed herein.

FIG. 4 illustrates a flow diagram of an example system in accordance with some embodiments discussed herein. In particular, FIG. 4 illustrates a method of for displaying a defined preview of a resource in a group-based communication interface, such as shown in FIG. 3, selected from a plurality of group-based communication interfaces, wherein the group-based communication interface comprises a plurality of group-based communication channels. As shown in block 402, defined preview server 102, including circuitry such as interface module 206 and input/output module 210, is configured to receive, from a client device hosting the group-based communication interface, a group-based message transmission including a group based message (e.g. group-based message 304C). The group based message is received at client device 110A, utilizing circuitry such as interface module 246 and input/output module 250, in the group-based communication interface (e.g. interface 300), associated with a selected group-based communication channel 303 of the plurality of multiple group-based communication channels 302, wherein the group-based message comprises a resource request that identifies a requested resource and a resource address. The client device 110A is then configured to send the group based message as a group based message transmission to defined preview server 102 utilizing communication module 248. In some examples, the resource request is a uniform resource locator (URL) such as shown in group-based message 304C.

As shown in relation to FIG. 5, the method may include further processing of the URL. As shown in block 502, defined preview server 102, including circuitry such as defined preview module 208, may be configured to parse (e.g., using PHP commands) the URL into one or more discrete components, such as an application protocol (e.g. "http://" or "https://"), a top level domain (e.g. ".com"), domains (e.g. "ACME") and subdomains ("12345").

As shown in block 504, 506, 508, and 510, defined preview server 102, including circuitry such as defined preview module 208, may be configured to verify the URL by determining the one or components of the URL: comprise a top-level-domain (TLD), comprise one or more domains and subdomains, are not an internet protocol (IP) address, and comprise an application protocol. This verification step provides security and verification of a resource request prior to the invocation of the further operations of the method. In some examples, defined preview server 102 will reject any data that is not expected and/or will not transmit or further process unexpected data including unexpected data from resource requests and unexpected data from defined preview data.

Referring back to FIG. 4, as shown in block 404, defined preview server 102, including circuitry such as defined preview module 208, is configured to compare the resource address with a list of subscribed resource addresses, such as may be stored in subscription database 214.

As shown in block 406, defined preview server 102, including circuitry such as defined preview module 208, is configured to determine from the comparison of the resource address and the subscribed resource addresses that the resource address is associated with a resource provider and is thus a subscribed resource address. The subscribed resource addresses allows for a resource provider to receive the resource request (through a defined preview request) and provide resource data for the defined preview instead of the defined preview server 102 utilizing metadata preview module 218 and pulling or gathering metadata or the like from a resource location associated with the resource address.

Referring now to FIG. 6, as shown in block 602, defined preview server 102, including circuitry such as defined preview module 208, may be configured to determine the subscribed resource addresses are associated with a defined preview application (APP). In some examples, the APP is maintained by the third party that also maintains the resource provider. For example, a resource provider may provide an APP, including software that provides enhancements to the group-based communication interface, such as the defined preview module 208 and communication module 212. Other additional enhancements of the APP may include an APP bot which is configured to start additional conversations with a user in other channels of the group-based communication interface, in conjunction with the handling of the resource request and defined preview data utilizing circuitry of server 102. The APP may include additional software enhancements to interface module 206, interface module 246, input/output module 206, and/or input/output module 250 to handle interactions from the interactive graphical elements, such as handling a user selection of a button, menu, or interactive group-based message in the defined preview. In some examples, the resource request is a first resource request that identifies the requested resource and the resource address received in the interface instance.

As shown in block 604, defined preview server 102, including circuitry such as defined preview module 208, may be configured to determine that the APP is not installed in a group-based communication interface instance. For example, if a user has never installed the APP on defined preview server 102, or if the resource requested has never been received in the interface instance before.

As shown in block 606, defined preview server 102, including circuitry such as defined preview module 208 and interface module 206, may be configured to install the APP in the interface instance, wherein an installation of the APP updates the group-based communication interface instance.

As shown in block 608, defined preview server 102, including circuitry such as interface module 206 and input/output module 210, is configured to receive user authentication information from a user. In some examples, this may include gathering user identification and login information for a service which requires authentication using input/output module 210. For example, the user may provide a user email and a user password to login to a service, such as a document editing service, hosted by the resource provider. In some examples, the defined preview server 102 may collect and provide user information in a uniform manner. For example, each resource provider will receive the same types of data from a user (e.g. identification and login information.) In other examples, the resource provider may determine which information needs to be collected from a user. For example, a resource provider, using authentication module 226, may determine only identification information needs to be collected from the user by defined preview server 102. The determination of what data to collect from the user will then be sent from the resource provider to defined preview server 102. In some examples, the user authentication information may also be collected from the user at client device 110A using modules 246 and 250 and provided to the defined preview server 102 by communication circuitry 248 as a group-based message transmission.

As shown in block 610, defined preview server 102, including circuitry such as defined preview module and communication module 212, may be configured to provide a user authentication token comprising the user authentication information to the resource provider. The user authentication token is then stored and used by authentication module 226 anytime a user inputs a resource request which requires authentication. In some examples, the resource provider may not require authentication information, or implement an alternate authentication method to the one described herein.

Referring back to FIG. 4 and as shown in block 408, defined preview server 102, including circuitry such as communication module 212, may be configured to, in response to determining that the resource address is the subscribed resource address, provide a defined preview request comprising authentication information to the resource provider (such as resource provider(s) 108A-108N). In some examples, the authentication information comprises an event token identifying the user, and wherein the resource provider compares the event token with a previously received user authentication token, as described above in relation to FIG. 6, and authenticates the defined preview request only when the event token and the user authentication token match. In some examples, the defined preview request further comprises one or more of an identification of the selected group-based communication channel, a timestamp representing a time the resource request was received, and an identification of a resource address, wherein the identification includes a uniform resource locator. In some additional examples, the defined preview request may include a user identification information along with a group-based identification information (e.g. a team or enterprise identification information), which may be used for authentication instead of a token. For example, if the data is not highly sensitive or protected data, authentication by event token/user authentication token, may not be needed.

As shown in block 410, defined preview server 102, including circuitry such as communication module 212, is configured to receive defined preview data from the resource provider. In some examples, the defined preview data comprises user authenticated defined preview data, wherein the user authenticated defined preview data is provided from the resource provider only in response to authenticated defined preview requests. In some examples, the security of the authentication method is managed and performed by the resource provider.

As shown in block 412, defined preview server 102, including circuitry such as interface module 206, is configured to render the defined preview (e.g. defined preview 312) of the resource based on the defined preview data to the group-based communication interface associated with the group-based message. In some examples, the defined preview 312 is provided to a client device 110A, such that it may be displayed on a group-based communication interface of the client device 110A by interface module 246. In some examples, the defined preview data is provided directly to the client device 110A, and rendered by interface module 246 such that it is displayed on a group-based communication interface of the client device 110A.

In some examples, the defined preview comprises interactive graphical elements (e.g. interactive graphical element 322), wherein each interactive graphical element comprises a user selectable item. For example, a computer bug tracking resource provider may return defined preview data including a button (user selectable item) which, when selected by a user begins a user interaction with the resource provider and handled by the bug tracking resource provider.

Figure 7:
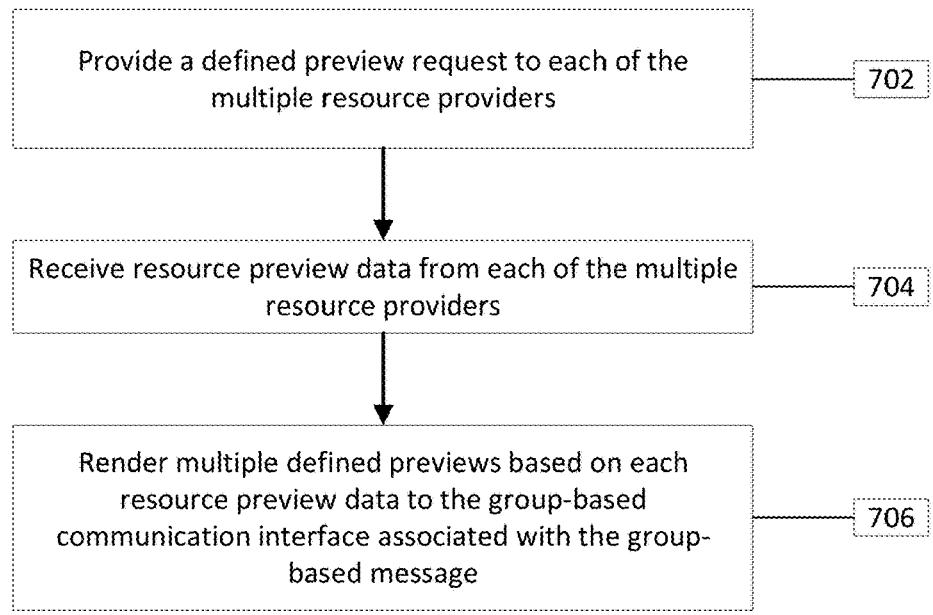
FIG. 7 illustrates a flow diagram for rendering multiple defined previews in a group-based communication interface in accordance with some embodiments discussed herein.

FIG. 7 illustrates an additional flow diagram of an example system in accordance with some embodiments discussed herein. In some examples, the resource address is subscribed to by several resource providers, wherein each of the resource providers will provider defined preview data of the same or a different resource. As shown in block 702, defined preview server 102, including circuitry such as communication module 212, is configured to provide a defined preview request to each of the multiple resource providers.

As shown in block 704, defined preview server 102, including circuitry such as communication module 212, is configured to receive defined preview data from each of the multiple resource providers.

As shown in block 706, defined preview server 102, including circuitry such as interface module 206, is configured to render multiple defined previews based on each defined preview data to the group-based communication interface associated with the group-based message. In some examples, the defined previews will be rendered in the order of the received defined preview data.

Figure 8:
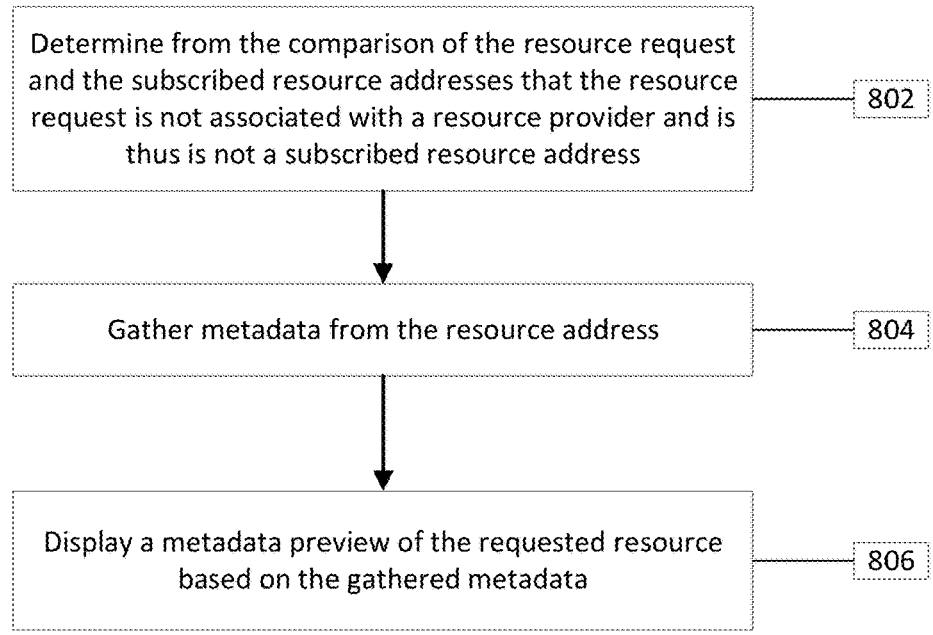
FIG. 8 illustrates a flow diagram for displaying a metadata preview in a group-based communication interface in accordance with some embodiments discussed herein.

FIG. 8 illustrates an additional flow diagram of an example system in accordance with some embodiments discussed herein. In some examples, the resource request is not associated with a subscribed resource address, thus a metadata preview process may occur. As shown in block 802, defined preview server 102, including circuitry such as defined preview module 208, is configured to determine from the comparison of the resource request and the subscribed resource addresses that the resource request is not associated with a resource provider and is thus is not a subscribed resource address.

As shown in block 804, defined preview server 102, including circuitry such as metadata preview module in conjunction with communication module 212 and/or input output module 210, is configured to gather metadata from the resource address, such as resource locations 106A-106N.

As shown in block 806, defined preview server 102, including circuitry such as metadata preview module 218, is configured to render a metadata preview of the requested resource based on the gathered metadata (e.g. metadata preview 308). In some examples, the metadata preview is provided to a client device 110A, such that it may be displayed on a group-based communication interface of the client device 110A by interface module 246. In some examples, the gathered metadata is provided directly to the client device 110A, and rendered by interface module 246 such that it is displayed on a group-based communication interface of the client device 110A.

Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A method comprising:
receiving, via a group-based communication platform, a message including a resource request that identifies a requested resource and a resource address;
determining, based at least in part on the resource address, that the resource address is subscribed to by one or more resource providers;
receiving, based at least in part on determining that the resource address is subscribed to by the one or more resource providers, authentication information associated with a user and the one or more resource providers;
transmitting a preview request comprising the authentication information to the one or more resource providers, the preview request identifying the requested resource;
receiving, from the one or more resource providers and based at least in part on the preview request and the authentication information, preview data associated with the requested resource; and
causing, based at least in part on the preview data, a computing device associated with the user to display a preview of the requested resource via the group-based communication platform.

2. The method of claim 1, further comprising generating the preview based at least in part on receiving the preview data, wherein generating the preview occurs prior to posting the message to a channel of the group-based communication platform.

3. The method of claim 1, further comprising generating the preview based at least in part on receiving the preview data, wherein generating the preview occurs after posting the message to a channel of the group-based communication platform.

4. The method of claim 1, further comprising:
determining that an authentication associated with the authentication information failed; and
receiving, based at least in part on the resource address, metadata associated with the requested resource,
wherein causing display of the preview comprises generating a metadata preview based at least in part on the metadata associated with the requested resource.

5. The method of claim 1, further comprising:
determining that the resource request is associated with an application;
determining that the application is not installed in a group-based communication interface instance;
installing the application in the group-based communication interface instance, wherein installing the application in the group-based communication interface instance includes updating the group-based communication interface instance;
receiving user authentication information associated with the application and the user; and
providing a user authentication token associated with the user authentication information to the one or more resource providers.

6. The method of claim 1, wherein receiving the authentication information is based at least in part on retrieving a user authentication token associated with the one or more resource providers.

7. The method of claim 6, wherein the user authentication token is stored based at least in part on at least one of installing an application associated with the one or more resource providers or receiving the user authentication token as part of an authentication process associated with a service hosted by the one or more resource providers.

8. A system comprising:
one or more processors;
memory storing processor-executable instructions that, when executed by the one or more processors, cause the system to perform operations comprising:
receiving, via a group-based communication platform, a message including a resource request that identifies a requested resource and a resource address;
determining, based at least in part on the resource address, that the resource address is subscribed to by one or more resource providers;
receiving, based at least in part on determining that the resource address is subscribed to by the one or more resource providers, authentication information associated with a user and the one or more resource providers;
transmitting a preview request comprising the authentication information to the one or more resource providers, the preview request identifying the requested resource;
receiving, from the one or more resource providers and based at least in part on the preview request and the authentication information, preview data associated with the requested resource; and
causing, based at least in part on the preview data, a computing device associated with the user to display a preview of the requested resource via the group-based communication platform.

9. The system of claim 8, wherein the operations further comprise:
determining that the resource request is associated with an application;
determining that the application is not installed in a group-based communication interface instance;
installing the application in the group-based communication interface instance, wherein installing the application in the group-based communication interface instance includes updating the group-based communication interface instance;
receiving user authentication information associated with the application and the user; and
providing a user authentication token associated with the user authentication information to the one or more resource providers.

10. The system of claim 8, wherein receiving the authentication information is based at least in part on retrieving a user authentication token associated with the one or more resource providers.

11. The system of claim 8, wherein the operations further comprise:
determining that an authentication associated with the authentication information failed; and
receiving, based at least in part on the resource address, metadata associated with the requested resource,
wherein displaying the preview comprises rendering a metadata preview based at least in part on the metadata associated with the requested resource.

12. The system of claim 8, wherein the operations further comprise generating the preview based at least in part on receiving the preview data, wherein generating the preview occurs prior to posting the message to a channel of the group-based communication platform.

13. The system of claim 8, wherein the preview data comprises user-authenticated preview data, wherein the user-authenticated preview data is provided from the one or more resource providers in response to positively authenticating the authentication information.

14. A non-transitory computer-readable medium storing processor-executable instructions that, when executed by one or more processors, cause the one or more processors to perform operations comprising:
receiving, via a group-based communication platform, a message including a resource request that identifies a requested resource and a resource address;
determining, based at least in part on the resource address, that the resource address is subscribed to by one or more resource providers;
receiving, based at least in part on determining that the resource address is subscribed to by the one or more resource providers, authentication information associated with a user and the one or more resource providers;
transmitting a preview request comprising the authentication information to the one or more resource providers, the preview request identifying the requested resource;
receiving, from the one or more resource providers and based at least in part on the preview request and the authentication information, preview data associated with the requested resource; and
causing, based at least in part on the preview data, a computing device associated with the user to display a preview of the requested resource via the group-based communication platform.

15. The non-transitory computer-readable medium of claim 14, wherein the operations further comprise:
determining that the resource request is associated with an application;

determining that the application is not installed in a group-based communication interface instance;

installing the application in the group-based communication interface instance, wherein installing the application in the group-based communication interface instance includes updating the group-based communication interface instance;

receiving user authentication information associated with the application and the user; and providing a user authentication token associated with the user authentication information to the one or more resource providers.

16. The non-transitory computer-readable medium of claim 14, wherein receiving the authentication information is based at least in part on retrieving a user authentication token associated with the one or more resource providers.

17. The non-transitory computer-readable medium of claim 14, wherein the operations further comprise:

determining that an authentication associated with the authentication information failed; and receiving, based at least in part on the resource address, metadata associated with the requested resource, wherein displaying the preview comprises rendering a metadata preview based at least in part on the metadata associated with the requested resource.

18. The non-transitory computer-readable medium of claim 14, wherein the operations further comprise generating the preview based at least in part on receiving the preview data, wherein generating the preview occurs after posting the message to a channel of the group-based communication platform.

19. The non-transitory computer-readable medium of claim 14, wherein the preview data comprises user-authenticated preview data, wherein the user-authenticated preview data is provided from the one or more resource providers in response to positively authenticating the authentication information.

20. The non-transitory computer-readable medium of claim 14, wherein the preview comprises an interactive graphical element selectable to cause an action via an interface instance associated with the group-based communication platform.

* * * * *